United States Patent
Kang et al.

(10) Patent No.: US 10,820,277 B2
(45) Date of Patent: Oct. 27, 2020

(54) UPLINK POWER ALLOCATION METHOD, UPLINK POWER ALLOCATION DEVICE AND UPLINK POWER ALLOCATION SYSTEM

(71) Applicant: CHINA ACADEMY OF TELECOMMUNICATIONS TECHNOLOGY, Beijing (CN)

(72) Inventors: Shaoli Kang, Beijing (CN); Xiaodong Sun, Beijing (CN); Hao Liu, Beijing (CN); Bin Ren, Beijing (CN); Qiubin Gao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 310 days.

(21) Appl. No.: 15/749,772

(22) PCT Filed: Jun. 8, 2016

(86) PCT No.: PCT/CN2016/085289
§ 371 (c)(1),
(2) Date: Feb. 1, 2018

(87) PCT Pub. No.: WO2017/020651
PCT Pub. Date: Feb. 9, 2017

(65) Prior Publication Data
US 2020/0092822 A1    Mar. 19, 2020

(30) Foreign Application Priority Data
Aug. 3, 2015   (CN) .......................... 2015 1 0482803

(51) Int. Cl.
*H04W 52/14* (2009.01)
*H04W 52/24* (2009.01)
(Continued)

(52) U.S. Cl.
CPC ....... *H04W 52/146* (2013.01); *H04W 52/225* (2013.01); *H04W 52/241* (2013.01);
(Continued)

(58) Field of Classification Search
CPC .... H01Q 1/246; H01Q 3/2617; H01Q 21/205; H04B 1/00; H04B 1/69; H04B 1/707;
(Continued)

(56) References Cited

U.S. PATENT DOCUMENTS 6,671,516 B1 * 12/2003 Doi ..................... H04W 72/085
                                                 455/450
2004/0053587 A1 * 3/2004 Nagai .................... H04B 7/005
                                                 455/132
(Continued)

FOREIGN PATENT DOCUMENTS

| CN | 102395184 A | 3/2012 |
| CN | 106658694 A | 5/2017 |
| WO | 2013120442 A1 | 8/2013 |

OTHER PUBLICATIONS

From EPO Application No. 16832139.6, extended European search report and search opinion dated Jul. 23, 2018.
(Continued)

*Primary Examiner* — Yuwen Pan
*Assistant Examiner* — Paul P Tran
(74) *Attorney, Agent, or Firm* — Ladas & Parry, LLP (57) ABSTRACT

An uplink power allocation method, an uplink power allocation device and an uplink power allocation system are provided. The uplink power allocation method includes: determining users to be paired, based on locations of the users within the cell; determining Patten Division Multiple Access (PDMA) pattern matrixes, allocating different PDMA pattern vector groups for the users respectively, and obtaining a power control pattern matrix based on the
(Continued)

PDMA pattern vector groups; and determining power control factors of the users in each pair based on the power control pattern matrix, and determining an uplink transmission power of each user based on the power control factors.

7 Claims, 4 Drawing Sheets

(51) Int. Cl.
*H04W 52/28* (2009.01)
*H04W 52/34* (2009.01)
*H04W 52/22* (2009.01)
*H04W 52/50* (2009.01)

(52) U.S. Cl.
CPC ....... *H04W 52/283* (2013.01); *H04W 52/346* (2013.01); *H04W 52/50* (2013.01)

(58) Field of Classification Search
CPC ......... H04B 7/2621; H04L 5/06; H04L 5/023; H04W 16/02; H04W 16/12; H04W 52/146; H04W 52/225; H04W 52/241; H04W 52/262; H04W 52/283; H04W 52/346; H04W 52/42; H04W 52/50; H04W 72/085
USPC ....................................................... 455/522
See application file for complete search history.

(56) References Cited

U.S. PATENT DOCUMENTS

| | | | | |
|---|---|---|---|---|
| 2009/0082052 | A1* | 3/2009 | Bhushan | H04W 52/146 455/522 |
| 2010/0165914 | A1* | 7/2010 | Cho | H04B 7/0695 370/328 |
| 2010/0291940 | A1* | 11/2010 | Koo | H04B 7/063 455/450 |
| 2015/0156786 | A1* | 6/2015 | Kim | H04B 7/0452 370/329 |
| 2016/0352002 | A1* | 12/2016 | Aue | H04B 7/0617 |
| 2017/0214439 | A1* | 7/2017 | Shtrom | H04B 7/0413 |

OTHER PUBLICATIONS

"Report ITU-R M. 2320-0 M Series Mobile, radiodetermination, amateur and related satellite services"; 3GPP Draft; France; Mar. 4, 2014; pp. 1-31.
From PCT/CN2016/085289, International Search Report dated Aug. 26, 2016 with machine English translation from WIPO.
From PCT/CN2016/085289, Written Opinion dated Aug. 26, 2016 with machine English translation from WIPO.
From PCT/CN2016/085289, International Preliminary Report on Patentability (IPRP; Ch. 1) dated Feb. 15, 2018 with machine English translation from WIPO.
Kang et al., "5G-Oriented PDMA Pattern Division Multiple Access Technology"; Telecommunications Network Technology; No. 5; May 15, 2015; pp. 43-47; with machine English translation provided by client.

* cited by examiner

|  | User 1 | User 2 | User 3 | User 4 | User 5 | User 6 | User 7 |
|---|---|---|---|---|---|---|---|
| time-frequency resource 1 | 1/3 | 1/2 | 1/2 | 0 | 1 | 0 | 0 |
| time-frequency resource 2 | 1/3 | 1/2 | 0 | 1/2 | 0 | 1 | 0 |
| time-frequency resource 3 | 1/3 | 0 | 1/2 | 1/2 | 0 | 0 | 1 |

Fig.3

|  | User 1 | User 2 | User 3 | User 4 | User 5 | User 6 | User 7 |
|---|---|---|---|---|---|---|---|
| time-frequency resource 1 | 1 | 3/2 | 3/2 | 0 | 3 | 0 | 0 |
| time-frequency resource 2 | 1 | 3/2 | 0 | 3/2 | 0 | 3 | 0 |
| time-frequency resource 3 | 1 | 0 | 3/2 | 3/2 | 0 | 0 | 3 |

Fig.4

UPLINK POWER ALLOCATION METHOD, UPLINK POWER ALLOCATION DEVICE AND UPLINK POWER ALLOCATION SYSTEM

CROSS-REFERENCE TO RELATED APPLICATIONS

The present application is the U.S. national phase of PCT Application PCT/CN2016/085289 filed on Jun. 8, 2016 which claims the priority to Chinese patent application No. 201510482803.X filed on Aug. 3, 2015, the disclosures of which are incorporated herein by reference in their entireties.

TECHNICAL FIELD

The present disclosure relates to wireless communication technology, particularly to an uplink power allocation method, an uplink power allocation device and an uplink power allocation system.

BACKGROUND

Similar to the Time Division Multiple Access (TDMA), the Frequency Division Multiple Access (FDMA), and the Code Division Multiple Access (CDMA) in the related art, the Pattern Division Multiple Access (PDMA) technology, as a key technology of a 5G wireless communication system, supports multiple users to perform transmissions in the same time domain, frequency domain, spatial resources, and is able to distinguish the users based on an encoding domain and power, to enhance cell average spectral efficiency and edge user spectral efficiency and increase the number of users accessing to the cell.

An uplink of a Long Term Evolution (LTE) system adopts a power control technology, in order to ensure the system to have a good forward compatibility, it may be predicted that an uplink of the 5G system may still adopt an uplink power control technology to determine uplink transmission power of the uplink terminal. Since the transmission of the PDMA technology in the encoding domain and the power domain are superimposed, the uplink transmission power of the terminal may be adversely affected.

The LTE uplink power control in the related art is performed through an open-loop estimation together with a close-loop adjustment. According to the open-loop estimation, an initial value of the uplink transmission power of the terminal is determined based on a desired receiving power, uplink resource allocation, a transmission format, a path loss and so on, then the real-time close-loop adjustment is performed in response to a power control command sent by the base station. A path loss compensation is introduced in the open-loop uplink transmission power determination, to prevent the overlarge uplink transmission power of the edge users of the cell from interfering with the neighbor cells. Taking LTE Physical Uplink Shared Channel (PUSCH) as an example, the uplink transmission power is determined through the following formula: $P_{PUSCH}(i) \min\{10 \log_{10}(M_{PUSCH}(i)) + P_{0\_PUSCH}(j) + \alpha(j) \cdot PL + \Delta_{TF}(i) + f(i), P_{CMAX}\}$, where $P_{PUSCH}(i)$ represents an uplink transmitting power of a terminal on a sub-frame i, $M_{PUSCH}(i)$ represents a resource allocated for the subframe i on the PUSCH, which is indicated by the number of resource blocks, $P_{0\_PUSCH}(j)$ represents a power initial value of the PUSCH, and j is related to a scheduling license of a PUSCH transmission/retransmission, $\alpha(j)$ represents a path loss compensation factor, PL represents a path loss, which is estimated based on a reference signal, $\Delta_{TF}(i)$ represents a power adjustment of the sub-frame i relevant with the MCS, f(i) represents the current power adjustment, $P_{CMAX}$ represents the maximum uplink transmission power of the terminal.

In the 5G system, when the PDMA technology is used in conjunction with the uplink power control technology, the multiple users perform the transmissions on the same time-frequency resources, and the users are distinguished according to encodings and power, therefore an Interference Over Thermal (ITO) of the system may be lifted, thereby adversely affecting the power consumption of the terminal, the number of users accessing to the cell, the cell average spectral efficiency and the edge user spectral efficiency. How to adjust the power for each user in the allocated power PDMA codebook pattern to avoid a large system IOT lift meanwhile improving the number of users accessing to the cell, the cell average spectral efficiency and the edge user spectral efficiency, is a main technical issue of the PDMA technology.

The following problems exist in the prior art: according to the uplink power control in the LTE system, the transmission power of each terminal on each Physical Resource Block (PRB) is controlled. When the PDMA technology is used in conjunction with the uplink power control technology, if the uplink power control in the related art is still used, the uplink detection may become more complicated, and the uplink transmission power of the terminal may become too large or even exceed the maximum uplink transmission power of the terminal, thereby lifting significantly the uplink ITO, resulting the number of accessing users, decrease the cell average spectral efficiency and the edge user spectral efficiency.

SUMMARY

An uplink power allocation method, an uplink power allocation device and an uplink power allocation system are provided in the present disclosure, so as to solve the following technical issues in the related art: when the PDMA technology is used in conjunction with the uplink power control technology, the different system IOT liftings may be caused in the case that the PDMA codebook adopts different power control modes, thereby adversely affecting the system performance when using the PDMA technology.

An uplink power control method is provided in the present disclosure, applied to a base station forming at least one cell, where the method includes: determining users to be paired, based on locations of the users within the cell; determining Pattern Division Multiple Access (PDMA) pattern matrixes, allocating different PDMA pattern vector groups for the users respectively, and obtaining a power control pattern matrix based on the PDMA pattern vector groups; and determining power control factors of the users in each pair based on the power control pattern matrix, and determining an uplink transmission power of each user based on the power control factors.

Optionally, the determining PDMA pattern matrixes, allocating different PDMA pattern vector groups for the users respectively, and obtaining a power control pattern matrix based on the PDMA pattern vector groups includes: selecting a PDMA pattern matrix $H_{PDMA}(M*N)$ for an uplink based on a total number of the users within the cell and total resources of a system, where M is a number of rows of the PDMA pattern matrix $H_{PDMA}(M*N)$ and N is a number of columns of the PDMA pattern matrix $H_{PDMA}(M*N)$; calculating the PDMA pattern vector group for each user based on the PDMA pattern matrix $H_{PDMA}(M*N)$ and a power control factor matrix $$\begin{bmatrix} \alpha_{11}^1 & \cdots & \alpha_{1N_1}^1 & \cdots & \alpha_{11}^K & \cdots & \alpha_{1N_K}^K \\ \alpha_{21}^1 & \cdots & \alpha_{2N_1}^1 & \cdots & \alpha_{21}^K & \cdots & \alpha_{2N_K}^K \\ \vdots & \ddots & \vdots & \cdots & \vdots & \ddots & \vdots \\ \alpha_{M1}^1 & \cdots & \alpha_{MN_1}^1 & \cdots & \alpha_{M1}^K & \cdots & \alpha_{MN_K}^K \end{bmatrix},$$

to generate the power control pattern matrix $$A = \begin{bmatrix} \alpha_{11}^1 & \cdots & \alpha_{1N_1}^1 & \cdots & \alpha_{11}^K & \cdots & \alpha_{1N_K}^K \\ \alpha_{21}^1 & \cdots & \alpha_{2N_1}^1 & \cdots & \alpha_{21}^K & \cdots & \alpha_{2N_K}^K \\ \vdots & \ddots & \vdots & \cdots & \vdots & \ddots & \vdots \\ \alpha_{M1}^1 & \cdots & \alpha_{MN_1}^1 & \cdots & \alpha_{M1}^K & \cdots & \alpha_{MN_K}^K \end{bmatrix} \square$$

$$H_{PDMA} = [A_1, A_2, \ldots, A_k],$$

where K represents a number of uplink paired user, $N_1$, $N_2$, ..., $N_k$ represent respectively the numbers of columns of the PDMA pattern matrix $H_{PDMA}(M*N)$ occupied by the users 1, 2, ..., K, where $N = N_1 + N_2 + \ldots + N_K$, $A_1$, $A_2$, ..., $A_K$ represent respectively power control pattern vector groups for the users 1, 2, ..., K, and $\square$ represents a dot matrixing.

Optionally, the determining power control factors of the users in each pair based on the power control pattern matrix includes: selecting an uplink power control optimization mode; adjusting a current combination of the PDMA pattern vector group and the power control factor of each user, to enable a Proportional Fair (PF) weighted sum throughput to satisfy the formula $$A_{opt} = \underset{A}{\operatorname{argmax}} \left\{ \sum_{k=1}^{K} \frac{T_k(SINR_{k,A}) \cdot (1 - BLER_k(SINR_{k,A}))}{\overline{R}_k(t)} \right\}$$

and $\|A\|_1 = 1$, and to maximize the PF weighted sum throughput per power consumption unit in the case that the users are paired, where $T_k(SINR_{k,A})$ represents a transmission rate of a user k in the case that the power control pattern matrix of the user k is A, calculated based on transmission bit numbers mapped from a Signal to Interference plus Noise Ratio (SINR) of the user k and resources occupied by the user k, a value of the SINR of the user k is related to the power control factors in the PDMA pattern matrix, $BLER_k(SINR_{k,A})$ represents an estimated Block Error Rate (BLER) in the case that the power control pattern matrix of the user k is A, calculated based on a mapping of the SINR and the BLER, $\overline{R}_k(t)$ represents a historical average rate of the user k at a time point t, $P_t(\|A_k\|_1)$ represents total uplink transmission power in the case that the power control pattern matrix of the user k is A and $P_t(\|A_k\|_1)$ is smaller than or equal to maximum uplink transmission power $P_{max}$ of a user terminal, and $\|\cdot\|_1$ represents summing up matrix elements; the historical average rate is calculated based on the formula $\overline{R}_k(t) = \alpha \cdot R_k(t) + (1-\alpha) \cdot \overline{R}_k(t-1)$, where $\overline{R}^k(t)$ represents the historical average rate of the user k at a current time point t, $\overline{R}_k(t-1)$ represents the historical average rate of the user k at a previous time point t-1, $R_k(t)$ represents a current rate of the user k, $\alpha$ represents a forgetting factor, and the PF weighted sum throughput is related to the current rate of the user k in the case that $\alpha = 1$.

Optionally, the determining power control factors of the users in each pair based on the power control pattern matrix includes: selecting an uplink power control simplification mode; determining whether a first simplification mode or a second simplification mode for determining the power control pattern matrix is used, based on a ratio of the uplink transmission power of the user to an uplink transmission power of an Orthogonal Frequency Division Multiple Access (OFDMA) user. In the first simplification mode, the uplink transmission power of the user is equal to the uplink transmission power of the OFDMA user, a smallest unit of resources occupied by the user is one PDMA pattern vector group and one PDMA pattern vector group is permitted to occupy a plurality of Physical Resource Blocks (PRBs), and a smallest unit of resources occupied by the OFDMA user is one PRB. In the second simplification mode, the uplink transmission power of the user is a multiple of a number of rows of the PDMA pattern vector group of the uplink transmission power of the OFDMA user, and the power control pattern matrix enables a transmission power of the smallest unit of the resources occupied by the PDMA user to be equal to a multiple of the number of rows of the PDMA pattern vector group of a transmission power of the smallest unit of the resources occupied by the OFDMA user.

Optionally, subsequent to the determining users needing to be paired, the method further includes: determining uplink transmission power of each user per PRB unit, through an uplink power control.

An uplink power control device is further provided in the present disclosure, including: a pairing unit, configured to determine users to be paired, based on locations of the users within the cell; a power control pattern matrix unit, configured to determine PDMA pattern matrixes, allocate different PDMA pattern vector groups for the users respectively, and obtain a power control pattern matrix based on the PDMA pattern vector groups; and an uplink transmission power unit, configured to determine power control factors of the users, and determine an uplink transmission power of each user.

Optionally, the power control pattern matrix unit includes: a PDMA pattern matrix module configured to determine a PDMA pattern matrix $H_{PDMA}(M*N)$ based on a total number of the users within the cell and total resources of a system, where M is a number of rows of the PDMA pattern matrix $H_{PDMA}(M*N)$ and N is a number of columns of the PDMA pattern matrix $H_{PDMA}(M*N)$; a power control pattern matrix selecting module, configured to calculate the PDMA pattern vector group for each user based on the PDMA pattern matrix $H_{PDMA}(M*N)$ and a power control factor matrix $$\begin{bmatrix} \alpha_{11}^1 & \cdots & \alpha_{1N_1}^1 & \cdots & \alpha_{11}^K & \cdots & \alpha_{1N_K}^K \\ \alpha_{21}^1 & \cdots & \alpha_{2N_1}^1 & \cdots & \alpha_{21}^K & \cdots & \alpha_{2N_K}^K \\ \vdots & \ddots & \vdots & \cdots & \vdots & \ddots & \vdots \\ \alpha_{M1}^1 & \cdots & \alpha_{MN_1}^1 & \cdots & \alpha_{M1}^K & \cdots & \alpha_{MN_K}^K \end{bmatrix},$$

to generate the power control pattern matrix $$A = \begin{bmatrix} \alpha_{11}^1 & \cdots & \alpha_{1N_1}^1 & \cdots & \alpha_{11}^K & \cdots & \alpha_{1N_K}^K \\ \alpha_{21}^1 & \cdots & \alpha_{2N_1}^1 & \cdots & \alpha_{21}^K & \cdots & \alpha_{2N_K}^K \\ \vdots & \ddots & \vdots & \cdots & \vdots & \ddots & \vdots \\ \alpha_{M1}^1 & \cdots & \alpha_{MN_1}^1 & \cdots & \alpha_{M1}^K & \cdots & \alpha_{MN_K}^K \end{bmatrix} \square$$

$$H_{PDMA} = [A_1, A_2, \ldots, A_K],$$

where K represents a number of uplink paired user, $N_1$, $N_2, \ldots, N_k$ represent respectively the numbers of columns of the PDMA pattern matrix $H_{PDMA}$(M*N) occupied by the users 1, 2, . . . , K, where $N=N_1+N_2+ \ldots +N_K$, $A_1$, $A_2, \ldots, A_K$ represent respectively power control pattern vector groups for the users 1, 2, . . . , K, and $\square$ represents a dot matrixing.

Optionally, the uplink transmission power unit includes: an uplink mode selecting module, configured to select an uplink power control optimization mode; an optimization power control pattern matrix calculation module, configured to adjust a current combination of the PDMA pattern vector group and the power control factor of each user, to enable a Proportional Fair (PF) weighted sum throughput to satisfy the formula $$A_{opt} = \underset{A}{\mathrm{argmax}} \left\{ \sum_{k=1}^{K} \frac{T_k(SINR_{k,A}) \cdot (1 - BLER_k(SINR_{k,A}))}{\overline{R}_k(t)} \right\}$$

and $\|A\|_1 = 1$, and to maximize the PF weighted sum throughput per power consumption unit in the case that the users are paired, where $T_k(SINR_{k,A})$ represents a transmission rate of a user k in the case that the power control pattern matrix of the user k is A, calculated based on transmission bit numbers mapped from a Signal to Interference plus Noise Ratio (SINR) of the user k and resources occupied by the user k, a value of the SINR of the user k is related to the power control factors in the PDMA pattern matrix, $BLER_k(SINR_k, A)$ represents an estimated Block Error Rate (BLER) in the case that the power control pattern matrix of the user k is A, calculated based on a mapping of the SINR and the BLER, $\overline{R}_k(t)$ represents a historical average rate of the user k at a time point t, $P_t(\|A_k\|_1)$ represents total uplink transmission power in the case that the power control pattern matrix of the user k is A and $P_t(\|A_k\|_1)$ is smaller than or equal to maximum uplink transmission power $P_{max}$ of a user terminal, and $\|\cdot\|$ represents summing up matrix elements; the historical average rate is calculated based on the formula $\overline{R}_k(t) = \alpha \cdot R_k(t) + (1-\alpha) \cdot \overline{R}_k(t-1)$, where $\overline{R}_k(t)$ represents the historical average rate of the user k at a current time point t, $\overline{R}_k(t-1)$ represents the historical average rate of the user k at a previous time point t-1, $R_k(t)$ represents a current rate of the user k, $\alpha$ represents a forgetting factor, and the PF weighted sum throughput is merely related to the current rate of the user k in the case that $\alpha=1$.

Optionally, the uplink mode selecting module is further configured to select an uplink power control simplification mode, and the uplink transmission power unit further includes an uplink transmission power control mode selecting module configured to determine whether a first simplification mode or a second simplification mode for determining the power control pattern matrix is used, based on a ratio of the uplink transmission power of the user to an uplink transmission power of an Orthogonal Frequency Division Multiple Access (OFDMA) user. In the first simplification mode, the uplink transmission power of the user is equal to the uplink transmission power of the OFDMA user, a smallest unit of resources occupied by the user is one PDMA pattern vector group and one PDMA pattern vector group is permitted to occupy a plurality of Physical Resource Blocks (PRBs), and a smallest unit of resources occupied by the OFDMA user is one PRB. In the second simplification mode, the uplink transmission power of the user is a multiple of a number of rows of the PDMA pattern vector group of the uplink transmission power of the OFDMA user, and the power control pattern matrix enables a transmission power of the smallest unit of the resources occupied by the PDMA user to be equal to a multiple of the number of rows of the PDMA pattern vector group of a transmission power of the smallest unit of the resources occupied by the OFDMA user.

Optionally, the device further includes an uplink transmission power unit configured to determine uplink transmission power of each user per PRB unit, through an uplink power control.

An uplink power allocation system is further provided, including a base station and a receiver, where the base station includes an uplink power allocation device, the uplink power allocation device includes: a pairing unit, configured to determine different kinds of users to be paired, based on locations of the users within the cell; a power control pattern matrix unit, configured to determine PDMA pattern matrixes, allocate different PDMA pattern vector groups for the users respectively, and obtain a power control pattern matrix based on the PDMA pattern vector groups; and an uplink transmission power unit, configured to determine power control factors of the users, and determine an uplink transmission power of each user; where the receiver is configured to cancel the users demodulated correctly through a successive interference cancellation and detect the other users.

According to the present disclosure, it is able to determine the uplink transmission power of the terminal by using the PDMA in conjunction with the LTE system uplink power control technology, thereby reducing the power consumption of the terminal, increasing the number of users accessing to the cell, and improving the cell average spectral efficiency and the edge user spectral efficiency.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

As a new non-orthogonal multiple access technology, the PDMA utilizes the asymmetry of multi-user channel, performs a mapping on multidimensional signal domains such as a time domain, a frequency domain, a code domain, a power domain and a spatial domain by designing a multi-user unequal diversity sparse coding matrix and a code modulation joint optimization model, so as to generate a non-orthogonal codebook pattern for distinguishing the users, and multiplex more users and realize a higher diversity gain. For the code domain superposition transmission, the users are distinguished on the same time-frequency resource according to the columns of the coding matrix. For the power domain superposition transmission, the users are distinguished on the same time-frequency resource according to the transmission power. For the spatial domain superposition transmission, the users are distinguished on the same time-frequency resource according to the data streams in the space.

Figure 1:
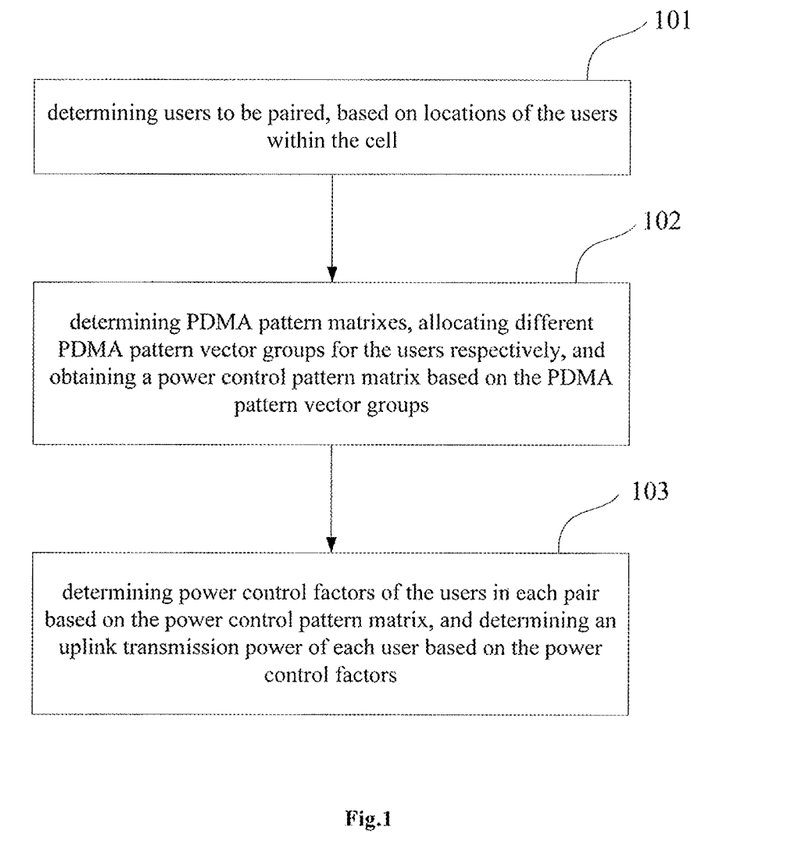
FIG. 1 is a flow chart of an uplink power control method.

The PDMA enables multiple users to perform the transmissions on the same time-domain, frequency-domain and spatial domain. In the 5G system, when the PDMA technology is used in conjunction with the uplink power control technology, the multiple users perform the transmissions on the same time-frequency resources, and the users are distinguished according to encodings and power, therefore the ITO of the system may be lifted, thereby adversely affecting the power consumption of the terminal, the number of users accessing to the cell, the cell average spectral efficiency and the edge user spectral efficiency. In view of this, an uplink power control method as shown in FIG. 1 is provided in some embodiments, including:

Step 101: determining users to be paired, based on locations of the users within the cell;

Step 102: determining Pattern Division Multiple Access (PDMA) pattern matrixes, allocating different PDMA pattern vector groups for the users respectively, and obtaining a power control pattern matrix based on the PDMA pattern vector groups, and determining an uplink transmission power of each user based on the power control pattern matrix, where the allocated PDMA pattern vector groups refer to one or more columns of the PDMA pattern matrix occupied by each user, and the allocation may be performed randomly, as long as the maximum Proportional Fair (PF) weighted sum throughput may be found;

Step 103, traversing combinations of the PDMA pattern vector group and the power control factor of all the users to find the combination enabling the PF weighted sum throughput per power consumption unit to be maximum, and determining the uplink transmission power of each user.

According to the present disclosure, it is able to determine the uplink transmission power of the terminal by using the PDMA in conjunction with the LTE system uplink power control technology, thereby reducing the power consumption of the terminal, increasing the number of users accessing to the cell, and improving the uplink cell average spectral efficiency and the edge user spectral efficiency. The users are distinguished according to the coding domains and the power domains, that is, the users are allocated with different PDMA codebook patterns and power, thereby increasing the number of users accessing to the cell, and improving the uplink cell average spectral efficiency and the edge user spectral efficiency.

In at least one embodiment of the present disclosure, subsequent to Step 101, the method further includes: determining uplink transmission power of each user per PRB unit, through an uplink power control in the related art.

In at least one embodiment of the present disclosure, the traversing combinations of the PDMA pattern vector group and the power control factor of all the users to find the combination enabling the PF weighted sum throughput per power consumption unit to be maximum comprising: calculating the PF weighted sum throughput per power consumption unit when the multiple users are paired, and in the case that the calculated PF weighted sum throughput per power consumption unit is not maximum, returning to the following step: allocating different PDMA pattern vector groups for the users respectively, and obtaining a power control pattern matrix based on the PDMA pattern vector groups, and determining an uplink transmission power of each user based on the power control pattern matrix.

The key of using the PDMA technology in conjunction with the uplink power control technology lies in selecting the power control pattern matrix and determining the uplink transmission power of the user. An optimization schedule and a simplification schedule are provided in some embodiments of the present disclosure according to the complexity level of selecting the power control pattern matrix and determining the uplink transmission power of the user.

The main principle of the optimization schedule is to search exhaustively. In at one embodiment of the present disclosure, in Step 102, the obtaining a power control pattern matrix based on the PDMA pattern vector groups, and determining an uplink transmission power of each user based on the power control pattern matrix, comprises: traversing all the paired users, allocating different PDMA pattern vector groups, uplink transmission power and all possible power control pattern matrixes for the users respectively, to minimum the power consumption in the case that the multiple users are paired and maximum the PF weighted sum throughput per power consumption unit.

In at least one embodiment of the present disclosure, the determining PDMA pattern matrixes, allocating different PDMA pattern vector groups for the users respectively, and obtaining a power control pattern matrix based on the PDMA pattern vector groups includes: selecting a PDMA pattern matrix $H_{PDMA}(M*N)$ for an uplink based on a total number of the users within the cell and total resources of a system, where M is a number of rows of the PDMA pattern matrix $H_{PDMA}(M*N)$ and N is a number of columns of the PDMA pattern matrix $H_{PDMA}(M*N)$; calculating the PDMA pattern vector group for each user based on the PDMA pattern matrix $H_{PDMA}(M*N)$ and a power control factor matrix $$\begin{bmatrix} \alpha_{11}^1 & \cdots & \alpha_{1N_1}^1 & \cdots & \alpha_{11}^K & \cdots & \alpha_{1N_K}^K \\ \alpha_{21}^1 & \cdots & \alpha_{2N_1}^1 & \cdots & \alpha_{21}^K & \cdots & \alpha_{2N_K}^K \\ \vdots & \ddots & \vdots & \cdots & \vdots & \ddots & \vdots \\ \alpha_{M1}^1 & \cdots & \alpha_{MN_1}^1 & \cdots & \alpha_{M1}^K & \cdots & \alpha_{MN_K}^K \end{bmatrix},$$

to generate the power control pattern matrix $$A = \begin{bmatrix} \alpha_{11}^1 & \cdots & \alpha_{1N_1}^1 & \cdots & \alpha_{11}^K & \cdots & \alpha_{1N_K}^K \\ \alpha_{21}^1 & \cdots & \alpha_{2N_1}^1 & \cdots & \alpha_{21}^K & \cdots & \alpha_{2N_K}^K \\ \vdots & \ddots & \vdots & \cdots & \vdots & \ddots & \vdots \\ \alpha_{M1}^1 & \cdots & \alpha_{MN_1}^1 & \cdots & \alpha_{M1}^K & \cdots & \alpha_{MN_K}^K \end{bmatrix} \square$$

$$H_{PDMA} = [A_1, A_2, \ldots, A_K],$$

where K represents a number of uplink paired user, $N_1$, $N_2, \ldots, N_k$ represent respectively the numbers of columns of the PDMA pattern matrix $H_{PDMA}$(M*N) occupied by the users 1, 2, ..., K, where $N=N_1+N_2+\ldots+N_K$, $A_1$, $A_2, \ldots, A_K$ represent respectively power control pattern vector groups for the users 1, 2, ..., K, and $\square$ represents a dot matrixing. The power control factor of each user is a sum of the row and column elements of the PDMA pattern matrix occupied by the corresponding user.

The combined utilization of the PDMA technology and the uplink power control technology is to search different power control factor combinations, so as to maximum the PF weighted sum throughput per power consumption unit in the case that the multiple users are paired. In at least one embodiment of the present disclosure, the principle of determining that PF weighted sum throughput per power consumption unit is maximum is:

$$A_{opt} = \underset{A}{\operatorname{argmax}} \left\{ \sum_{k=1}^{K} \frac{T_k(SINR_{k,A}) \cdot (1 - BLER_k(SINR_{k,A}))}{\overline{R}_k(t) \cdot P_t(\|A_k\|_1)} \right\} \text{ s.t.} \quad (2)$$

$$P_t(\|A_k\|) \leq P_{max},$$

where $T_k(SINR_{k,A})$ represents a transmission rate of a user k in the case that the power control pattern matrix of the user k is A, calculated based on transmission bit numbers mapped from a Signal to Interference plus Noise Ratio (SINR) of the user k and resources occupied by the user k, a value of the SINR of the user k is related to the power control factors in the PDMA pattern matrix, $BLER_k(SINR_{k,A})$ represents an estimated Block Error Rate (BLER) in the case that the power control pattern matrix of the user k is A, calculated based on a mapping of the SINR and the BLER, $\overline{R}_k(t)$ represents a historical average rate of the user k at a time point t, $P_t(\|A_k\|_1)$ represents total uplink transmission power in the case that the power control pattern matrix of the user k is A and $P_t(\|A_k\|_1)$ is smaller than or equal to maximum uplink transmission power $P_{max}$ of a user terminal, and $\|\cdot\|_1$ represents summing up matrix elements.

The determination of the maximum PF weighted sum throughput per power consumption unit is related to the historical average rate of the user k at a time point t. In at least one embodiment of the present disclosure, for any user k, the historical average rate is calculated based on the formula $\overline{R}_k(t)=\alpha \cdot R_k(t)+(1-\alpha) \cdot R_k(t-1)$, where $\overline{R}_k(t)$ represents the historical average rate of the user k at a current time point t, $\overline{R}_k(t-1)$ represents the historical average rate of the user k at a previous time point t−1, $R_k(t)$ represents a current rate of the user k, α represents a forgetting factor, and the PF weighted sum throughput is related to the current rate of the user k in the case that α=1.

Figure 2:
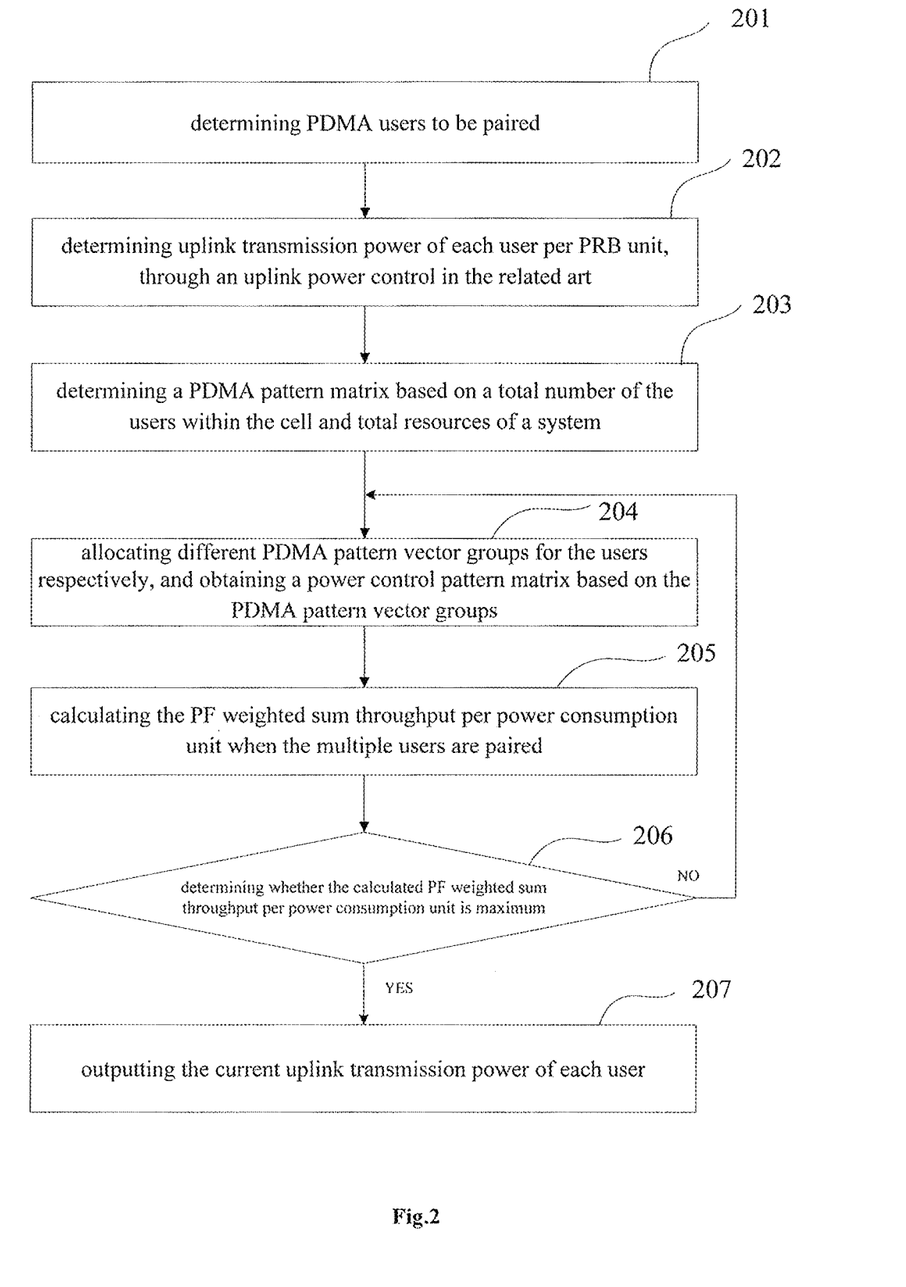
FIG. 2 is a flow chart of an uplink power control by the PDMA technology in conjunction with the uplink power control technology.

In an application scenario, the flow chart of an uplink power control by the PDMA technology in conjunction with the uplink power control technology is shown in FIG. 2, including:

Step 201: determining users to be paired, based on locations of the users within the cell;

Step 202: determining uplink transmission power of each user per PRB unit, through an uplink power control in the related art;

Step 203: determining a PDMA pattern matrix based on a total number of the users within the cell and total resources of a system;

Step 204: allocating different PDMA pattern vector groups for the users respectively, and obtaining a power control pattern matrix based on the PDMA pattern vector groups, and further determining an uplink transmission power of each user based on the power control pattern matrix;

Step 205: calculating the PF weighted sum throughput per power consumption unit when the multiple users are paired;

Step 206: determining whether the calculated PF weighted sum throughput per power consumption unit is maximum, and returning to Step 204 and allocating for the users the PDMA pattern vector groups or the power control factors different from the allocated previously in the case that calculated PF weighted sum throughput per power consumption unit is not maximum, or proceeding to Step 207 in the case that calculated PF weighted sum throughput per power consumption unit is maximum;

Step 207: determining and outputting the current uplink transmission power of each user.

Step 204 to Step 207 indicate that, it is needed to traverse combinations of the PDMA pattern vector group and the power control factor of all the paired users to find the combination enabling the PF weighted sum throughput per power consumption unit to be maximum.

In the optimization mode, searching for the optimal power control pattern matrix includes: selecting the users to be paired, allocating for the paired users different power control factor matrixes, obtaining the power control pattern matrix based on the PDMA pattern matrix, and determining whether the PF weighted sum throughput per power consumption unit of the power control pattern matrix is maximum until the power control pattern matrix having the maximum PF weighted sum throughput per power consumption unit is found.

The uplink power control by the PDMA technology in conjunction with the uplink power control technology may further adopt the simplification mode. The main principle of the simplification mode is to ensure that the sums of column elements of the power control pattern matrix of respective users are equal to each other.

According to a ratio of the uplink transmission power of the user to an uplink transmission power of an Orthogonal Frequency Division Multiple Access (OFDMA) user, there are simplification modes for selecting the power control pattern matrix. In at least one embodiment of the present disclosure, the determining a PDMA pattern matrix, allocating different PDMA pattern vector groups for the users respectively, and obtaining a power control pattern matrix based on the PDMA pattern vector groups includes: determining whether a first simplification mode or a second simplification mode for determining the power control pattern matrix is used, based on a ratio of the uplink transmission power of the user to an uplink transmission power of an OFDMA user.

In at least one embodiment of the present disclosure, the first simplification mode is used, the uplink transmission power of the user is equal to the uplink transmission power of the OFDMA user, a smallest unit of resources occupied by the user is one PDMA pattern vector group and one PDMA pattern vector group is permitted to occupy a plurality of Physical Resource Blocks (PRBs), and a smallest unit of resources occupied by the OFDMA user is one PRB.

Taking a typical [3, 7] PDMA pattern matrix as an example, a smallest unit of resources occupied by the user is three PRBs. A smallest unit of resources occupied by the PDMA user is the number of rows of the PDMA pattern matrix. A smallest unit of resources occupied by the OFDMA user is one PRB. The power control pattern matrix of the first simplification mode enables the total uplink transmission power of the PRB occupied by the PDMA pattern vector groups to be equal to the uplink transmission power of the OFDMA user per PRB.

In at least one embodiment of the present disclosure, the second simplification mode is used, the uplink transmission power of the user is a multiple of a number of rows of the PDMA pattern vector group of the uplink transmission power of the OFDMA user.

Taking an example that the user and the OFDMA user each occupies a smallest unit of resource, the power control pattern matrix of the second simplification mode enables the total uplink transmission power of the PRB occupied by the PDMA pattern vector groups to be equal to a multiple of a number of rows of the PDMA pattern vector group of the uplink transmission power of the OFDMA user per PRB.

Supposing that all the uplink resources are occupied, in compared with the OFDMA system, for the first simplification mode, the average IOT lifting of the PDMA system is a multiple of a ratio of the number of the paired PDMA users to a number of rows of the codebook. For the second simplification mode, the average IOT lifting of the PDMA system is a multiple of the number of the paired PDMA users. Although the IOT liftings of the two modes are different, the SINRs of the two modes are similar to each other. The power consumption of the terminal of the first simplification mode is lower than that of the second simplification mode. When occupying relatively few resource, because the uplink transmission power of the second simplification mode is larger, thereby improving effectively the cell spectral efficiency and the edge user spectral efficiency.

In the first application scenario, the key of using the PDMA technology in conjunction with the uplink power control technology lies in selecting the power control pattern matrix and determining the uplink transmission power of the user. When the simplification mode is adopted, taking a [3, 7] PDMA pattern matrix as an example, the PDMA codebook is $$\begin{bmatrix} 1 & 1 & 1 & 0 & 1 & 0 & 0 \\ 1 & 1 & 0 & 1 & 0 & 1 & 0 \\ 1 & 0 & 1 & 1 & 0 & 0 & 1 \end{bmatrix}.$$

Supposing there are three OFDMA users and the uplink transmission power of each user is 1, the total uplink transmission power of the OFDMA system is 3. Supposing there are seven PDMA users, when adopting the first and the second simplification modes to select the power control pattern matrix, the power control factors of the users on different time-frequency resource positions are different from each other.

Figure 3:
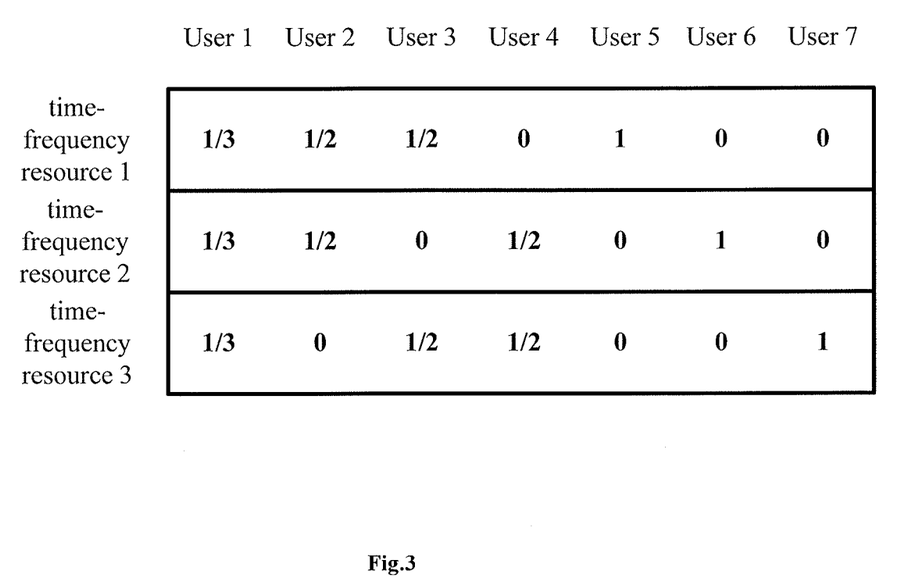
FIG. 3 shows that uplink transmission power of a user is equal to uplink transmission power of an OFDMA user.

In the first simplification mode, as shown in FIG. 3, there are a plurality of PDMA users, including user 1, user 2, user 3, user 4, user 5, user 6 and user 7, and the uplink transmission power of each user is 1, which is equal to the uplink transmission power of each OFDMA user. The total uplink transmission power of the PDMA system is 7. In the case that the PDMA system and the OFDMA system are fully loaded, the average IOT of the PDMA system is 7/3 of that of the OFDMA system.

Figure 4:
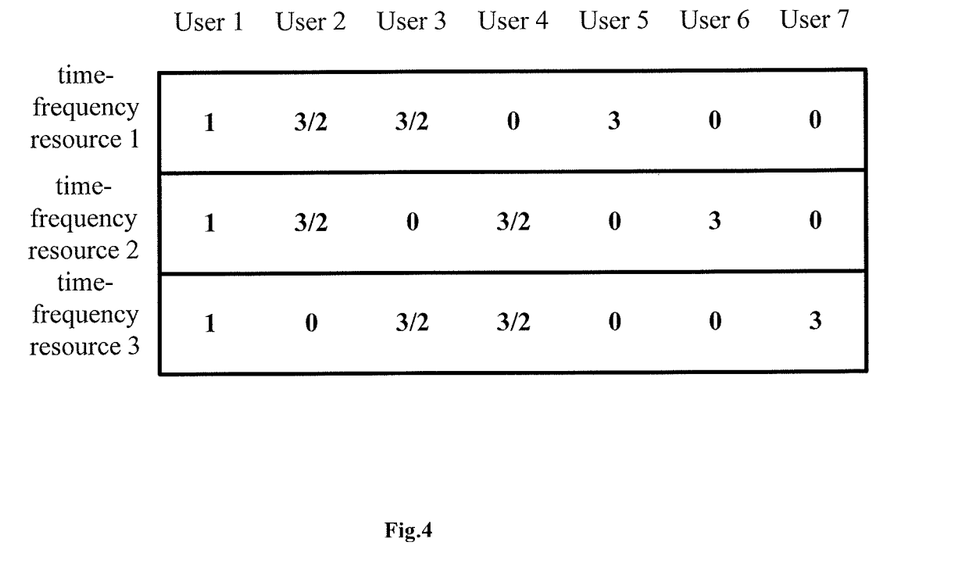
FIG. 4 shows that uplink transmission power of a user is a multiple of a number of rows of a PDMA pattern vector group of uplink transmission power of an OFDMA user.

In the second simplification mode, as shown in FIG. 4, there are a plurality of PDMA users, including user 1, user 2, user 3, user 4, user 5, user 6 and user 7, and the uplink transmission power of each user is 3, which is three times of the uplink transmission power of each OFDMA user. The total uplink transmission power of the PDMA system is 21. In the case that the PDMA system and the OFDMA system are fully loaded, the average IOT of the PDMA system is seven times of that of the OFDMA system.

The IOT liftings of the two simplification modes are different, however the SINRs thereof are both 7/3 regardless of noise. When a resource consumption rate is relatively low, because the uplink transmission power of the user in the second simplification mode is larger, the system performance may be improved significantly, however the power consumption of the terminal may be increased.

An uplink power control device is further provided in some embodiments of the present disclosure, including: a pairing unit, configured to determine users to be paired, based on locations of the users within the cell; a power control pattern matrix unit, configured to determine PDMA pattern matrixes, allocate different PDMA pattern vector groups for the users respectively, and obtain a power control pattern matrix based on the PDMA pattern vector groups; and an uplink transmission power unit, configured to determine power control factors of the users, and determine an uplink transmission power of each user.

In at least one embodiment of the present disclosure, the power control pattern matrix unit includes: a PDMA pattern matrix module configured to determine a PDMA pattern matrix $H_{PDMA}(M*N)$ based on a total number of the users within the cell and total resources of a system, where M is a number of rows of the PDMA pattern matrix $H_{PDMA}(M*N)$ and N is a number of columns of the PDMA pattern matrix $H_{PDMA}(M*N)$; a power control pattern matrix selecting module, configured to calculate the PDMA pattern vector group for each user based on the PDMA pattern matrix $H_{PDMA}(M*N)$ and a power control factor matrix $$\begin{bmatrix} \alpha_{11}^1 & \cdots & \alpha_{1N_1}^1 & \cdots & \alpha_{11}^K & \cdots & \alpha_{1N_K}^K \\ \alpha_{21}^1 & \cdots & \alpha_{2N_1}^1 & \cdots & \alpha_{21}^K & \cdots & \alpha_{2N_K}^K \\ \vdots & \ddots & \vdots & \cdots & \vdots & \ddots & \vdots \\ \alpha_{M1}^1 & \cdots & \alpha_{MN_1}^1 & \cdots & \alpha_{M1}^K & \cdots & \alpha_{MN_K}^K \end{bmatrix},$$

to generate the power control pattern matrix $$A = \begin{bmatrix} \alpha_{11}^1 & \cdots & \alpha_{1N_1}^1 & \cdots & \alpha_{11}^K & \cdots & \alpha_{1N_K}^K \\ \alpha_{21}^1 & \cdots & \alpha_{2N_1}^1 & \cdots & \alpha_{21}^K & \cdots & \alpha_{2N_K}^K \\ \vdots & \ddots & \vdots & \cdots & \vdots & \ddots & \vdots \\ \alpha_{M1}^1 & \cdots & \alpha_{MN_1}^1 & \cdots & \alpha_{M1}^K & \cdots & \alpha_{MN_K}^K \end{bmatrix},$$

$H_{PDMA} = [A_1, A_2, \ldots, A_K],$ where K represents a number of uplink paired user, $N_1$, $N_2, \ldots, N_k$ represent respectively the numbers of columns of the PDMA pattern matrix $H_{PDMA}(M*N)$ occupied by the users 1, 2, ..., K, where $N=N_1+N_2+\ldots+N^K$, $A_1$, $A_2, \ldots, A_K$ represent respectively power control pattern vector groups for the users 1, 2, ..., K, and □ represents a dot matrixing.

In at least one embodiment of the present disclosure, the uplink transmission power unit includes: an uplink mode selecting module, configured to select an uplink power control optimization mode; an optimization power control pattern matrix calculation module, configured to adjust a current combination of the PDMA pattern vector group and the power control factor of each user, to enable a Proportional Fair (PF) weighted sum throughput to satisfy the formula $$A_{opt} = \underset{A}{\operatorname{argmax}} \left\{ \sum_{k=1}^{K} \frac{T_k(SINR_{k,A}) \cdot (1 - BLER_k(SINR_{k,A}))}{\overline{R}_k(t)} \right\}$$

and $\|A\|_1 = 1$, and to maximize the PF weighted sum throughput per power consumption unit in the case that the users are paired, where $T_k(SINR_{k,A})$ represents a transmission rate of a user k in the case that the power control pattern matrix of the user k is A, calculated based on transmission bit numbers mapped from a Signal to Interference plus Noise Ratio (SINR) of the user k and resources occupied by the user k, a value of the SINR of the user k is related to the power control factors in the PDMA pattern matrix $BLER_k$ $(SINR_{k,A})$ represents an estimated Block Error Rate (BLER) in the case that the power control pattern matrix of the user k is A, calculated based on a mapping of the SINR and the BLER, $\overline{R}_k(t)$ represents a historical average rate of the user k at a time point t, $P_1(\|A_k\|_1)$ represents total uplink transmission power in the case that the power control pattern matrix of the user k is A and $P_1(\|A_k\|_1)$ is smaller than or equal to maximum uplink transmission power $P_{max}$ of a user terminal, and $\|\cdot\|_1$ represents summing up matrix elements; the historical average rate is calculated based on the formula $\overline{R}_k(t) = \alpha \cdot R_k(t) + (1-\alpha) \cdot \overline{R}_k(t-1)$, where $\overline{R}_k(t)$ represents the historical average rate of the user k at a current time point t, $\overline{R}_k(t-1)$ represents the historical average rate of the user k at a previous time point t−1, $R_k(t)$ represents a current rate of the user k, α represents a forgetting factor, and the PF weighted sum throughput is merely related to the current rate of the user k in the case that α=1.

In at least one embodiment of the present disclosure, the uplink transmission power unit further includes an uplink transmission power control mode selecting module configured to determine whether a first simplification mode or a second simplification mode for determining the power control pattern matrix is used, based on a ratio of the uplink transmission power of the user to an uplink transmission power of an Orthogonal Frequency Division Multiple Access (OFDMA) user. In the first simplification mode, the uplink transmission power of the user is equal to the uplink transmission power of the OFDMA user, a smallest unit of resources occupied by the user is one PDMA pattern vector group and one PDMA pattern vector group is permitted to occupy a plurality of Physical Resource Blocks (PRBs), and a smallest unit of resources occupied by the OFDMA user is one PRB. In the second simplification mode, the uplink transmission power of the user is a multiple of a number of rows of the PDMA pattern vector group of the uplink transmission power of the OFDMA user, and the power control pattern matrix enables a transmission power of the smallest unit of the resources occupied by the PDMA user to be equal to a multiple of the number of rows of the PDMA pattern vector group of a transmission power of the smallest unit of the resources occupied by the OFDMA user.

In at least one embodiment of the present disclosure, the device further includes an uplink transmission power unit configured to determine uplink transmission power of each user per PRB unit, through an uplink power control.

An uplink power allocation system is further provided in some embodiments of the present disclosure, including a base station and a receiver, where the base station includes an uplink power allocation device, the uplink power allocation device includes: a pairing unit, configured to determine different kinds of users to be paired, based on locations of the users within the cell; a power control pattern matrix unit, configured to determine PDMA pattern matrixes, allocate different PDMA pattern vector groups for the users respectively, and obtain a power control pattern matrix based on the PDMA pattern vector groups; and an uplink transmission power unit, configured to determine power control factors of the users, and determine an uplink transmission power of each user; where the receiver is configured to cancel the users demodulated correctly through a successive interference cancellation and detect the other users.

According to at least one embodiment of the present disclosure, the multiple users are distinguished on the coding domain and the frequency domain according the uplink transmission PDMA technology, and the transmissions are superimposed on the same time domain, frequency domain and spatial domain resources. On one hand, the number of uplink accessed users is increased, and the cell spectral efficiency and the edge user spectral efficiency are improved. On the other hand, the interference among the users may be introduced and the uplink IOT may be lifted as a result. By designing a rational uplink power control schedule, the performance of the PDMA system may be improved in compared with that of the OFDMA system, thereby reducing the power consumption of the terminal, increasing the number of users accessing to the cell, and improving the cell average spectral efficiency and the edge user spectral efficiency.

The above are merely the preferred embodiments of the present disclosure. A person skilled in the art may make further modifications and improvements without departing from the principle of the present disclosure, and these modifications and improvements shall also fall within the scope of the present disclosure.

What is claimed is:

1. An uplink power control method, applied to a base station forming at least one cell, wherein the method comprises:
    determining users to be paired, based on locations of the users within the cell;
    determining Pattern Division Multiple Access (PDMA) pattern matrixes, allocating different PDMA pattern vector groups for the users respectively, and obtaining a power control pattern matrix based on the PDMA pattern vector groups; and
    determining power control factors of the users in each pair based on the power control pattern matrix, and determining an uplink transmission power of each user based on the power control factors;
    wherein the determining PDMA pattern matrixes, allocating different PDMA pattern vector groups for the users respectively, and obtaining a power control pattern matrix based on the PDMA pattern vector groups comprises:

selecting a PDMA pattern matrix $H_{PDMA}(M*N)$ for an uplink based on a total number of the users within the cell and total resources of a system, wherein M is a number of rows of the PDMA pattern matrix $H_{PDMA}(M*N)$ and N is a number of columns of the PDMA pattern matrix $H_{PDMA}(M*N)$;

calculating the PDMA pattern vector group for each user based on the PDMA pattern matrix $H_{PDMA}(M*N)$ and a power control factor matrix $$\begin{bmatrix} \alpha_{11}^1 & L & \alpha_{1N_1}^1 & L & \alpha_{11}^K & L & \alpha_{1N_K}^K \\ \alpha_{21}^1 & L & \alpha_{2N_1}^1 & L & \alpha_{21}^K & L & \alpha_{2N_K}^K \\ M & O & M & L & M & O & M \\ \alpha_{M1}^1 & L & \alpha_{MN_1}^1 & L & \alpha_{M1}^K & L & \alpha_{MN_K}^K \end{bmatrix},$$

to generate the power control pattern matrix $$A = \begin{bmatrix} \alpha_{11}^1 & L & \alpha_{1N_1}^1 & L & \alpha_{11}^K & L & \alpha_{1N_K}^K \\ \alpha_{21}^1 & L & \alpha_{2N_1}^1 & L & \alpha_{21}^K & L & \alpha_{2N_K}^K \\ M & O & M & L & M & O & M \\ \alpha_{M1}^1 & L & \alpha_{MN_1}^1 & L & \alpha_{M1}^K & L & \alpha_{MN_K}^K \end{bmatrix} e$$

$$H_{PDMA} = [A_1, A_2, L, A_K],$$

wherein

K represents a number of uplink paired user, $N_1$, $N_2$, . . . , $N_k$ represent respectively the numbers of columns of the PDMA pattern matrix $H_{PDMA}(M*N)$ occupied by the users 1, 2, . . . , K, wherein $N=N_1+N_2+L+N_K$, $A_1$, $A_2$, . . . , $A_K$ represent respectively power control pattern vector groups for the users 1, 2, . . . , K, and □ represents a dot matrixing;

wherein the determining power control factors of the users in each pair based on the power control pattern matrix comprises:

selecting an uplink power control optimization mode;

adjusting a current combination of the PDMA pattern vector group and the power control factor of each user, to enable a Proportional Fair (PF) weighted sum throughput to satisfy the formula $$A_{opt} = \underset{A}{\operatorname{argmax}} \left\{ \sum_{k=1}^{K} \frac{T_k(SINR_{k,A}) \cdot (1 - BLER_k(SINR_{k,A}))}{\overline{R}_k(t)} \right\}$$

and $\|A\|_1 = 1$, and to maximize the PF weighted sum throughput per power consumption unit in the case that the users are paired, wherein $T_k(SINR_{k,A})$ represents a transmission rate of a user k in the case that the power control pattern matrix of the user k is A, calculated based on transmission bit numbers mapped from a Signal to Interference plus Noise Ratio (SINR) of the user k and resources occupied by the user k, a value of the SINR of the user k is related to the power control factors in the PDMA pattern matrix, $BLER_k(SINR_{k,A})$ represents an estimated Block Error Rate (BLER) in the case that the power control pattern matrix of the user k is A, calculated based on a mapping of the SINR and the BLER, $\overline{R}_k(t)$ represents a historical average rate of the user k at a time point t, $P_t(\|A_k\|_1)$ represents total uplink transmission power in the case that the power control pattern matrix of the user k is A and $P_t(\|A_k\|_1)$ is smaller than or equal to maximum uplink transmission power $P_{max}$ of a user terminal, and $\|\cdot\|_1$ represents summing up matrix elements;

the historical average rate is calculated based on the formula $\overline{R}_k(t) = \alpha \cdot R_k(t) + (1-\alpha) \cdot \overline{R}_k(t-1)$, wherein $\overline{R}_k(t)$ represents the historical average rate of the user k at a current time point t, $\overline{R}_k(t-1)$ represents the historical average rate of the user k at a previous time point t-1, $R_k(t)$ represents a current rate of the user k, α represents a forgetting factor, and the PF weighted sum throughput is related to the current rate of the user k in the case that α=1.

2. The method according to claim 1, wherein the determining power control factors of the users in each pair based on the power control pattern matrix comprises:

selecting an uplink power control simplification mode;

determining whether a first simplification mode or a second simplification mode for determining the power control pattern matrix is used, based on a ratio of the uplink transmission power of the user to an uplink transmission power of an Orthogonal Frequency Division Multiple Access (OFDMA) user, wherein in the first simplification mode, the uplink transmission power of the user is equal to the uplink transmission power of the OFDMA user, a smallest unit of resources occupied by the user is one PDMA pattern vector group and one PDMA pattern vector group is permitted to occupy a plurality of Physical Resource Blocks (PRBs), and a smallest unit of resources occupied by the OFDMA user is one PRB;

in the second simplification mode, the uplink transmission power of the user is a multiple of a number of rows of the PDMA pattern vector group of the uplink transmission power of the OFDMA user, and the power control pattern matrix enables a transmission power of the smallest unit of the resources occupied by the PDMA user to be equal to a multiple of the number of rows of the PDMA pattern vector group of a transmission power of the smallest unit of the resources occupied by the OFDMA user.

3. The method according to claim 1, wherein subsequent to the determining users needing to be paired, the method further comprises:

determining uplink transmission power of each user per PRB unit, through an uplink power control.

4. An uplink power control device, comprising a processor, a memory and a transceiver, wherein the processor is configured to read a program stored in the memory to:

determine users to be paired, based on locations of the users within the cell;

determine Pattern Division Multiple Access (PDMA) pattern matrixes, allocate different PDMA pattern vector groups for the users respectively, and obtain a power control pattern matrix based on the PDMA pattern vector groups; and determine power control factors of the users, and determine an uplink transmission power of each user:

the transceiver is configured to receive and transmit data;

the processor is configured to perform a general processing; and the memory is configured to store data for the operation of the processor;
wherein the processor is further configured to read a program stored in the memory to:
determine a PDMA pattern matrix $H_{PDMA}(M*N)$ based on a total number of the users within the cell and total resources of a system, wherein M is a number of rows of the PDMA pattern matrix $H_{PDMA}(M*N)$ and N is a number of columns of the PDMA pattern matrix $H_{PDMA}(M*N)$;
calculate the PDMA pattern vector group for each user based on the PDMA pattern matrix $H_{PDMA}(M*N)$ and a power control factor matrix $$\begin{bmatrix} \alpha_{11}^1 & L & \alpha_{1N_1}^1 & L & \alpha_{11}^K & L & \alpha_{1N_K}^K \\ \alpha_{21}^1 & L & \alpha_{2N_1}^1 & L & \alpha_{21}^K & L & \alpha_{2N_K}^K \\ M & O & M & L & M & O & M \\ \alpha_{M1}^1 & L & \alpha_{MN_1}^1 & L & \alpha_{M1}^K & L & \alpha_{MN_K}^K \end{bmatrix},$$

to generate the power control pattern matrix $$A = \begin{bmatrix} \alpha_{11}^1 & L & \alpha_{1N_1}^1 & L & \alpha_{11}^K & L & \alpha_{1N_K}^K \\ \alpha_{21}^1 & L & \alpha_{2N_1}^1 & L & \alpha_{21}^K & L & \alpha_{2N_K}^K \\ M & O & M & L & M & O & M \\ \alpha_{M1}^1 & L & \alpha_{MN_1}^1 & L & \alpha_{M1}^K & L & \alpha_{MN_K}^K \end{bmatrix} e$$

$$H_{PDMA} = [A_1, A_2, L, A_K],$$

wherein
K represents a number of uplink paired user, $N_1$, $N_2$, ..., $N_k$ represent respectively the numbers of columns of the PDMA pattern matrix $H_{PDMA}(M*N)$ occupied by the users 1, 2, ..., K, wherein $N=N_1+N_2+L+N_K$, $A_1$, $A_2$, ..., $A_K$ represent respectively power control pattern vector groups for the users 1, 2, ..., K, and □ represents a dot matrixing;
wherein the processor is further configured to read a program stored in the memory to:
select an uplink power control optimization mode;
adjust a current combination of the PDMA pattern vector group and the power control factor of each user, to enable a Proportional Fair (PF) weighted sum throughput to satisfy the formula $$A_{opt} = \underset{A}{\mathrm{argmax}} \left\{ \sum_{k=1}^{K} \frac{T_k(SINR_{k,A}) \cdot (1 - BLER_k(SINR_{k,A}))}{\overline{R}_k(t)} \right\}$$

and $\|A\|_1=1$, and to maximize the PF weighted sum throughput per power consumption unit in the case that the users are paired, wherein
$T_k(SINR_{k,A})$ represents a transmission rate of a user k in the case that the power control pattern matrix of the user k is A, calculated based on transmission bit numbers mapped from a Signal to Interference plus Noise Ratio (SINR) of the user k and resources occupied by the user k, a value of the SINR of the user k is related to the power control factors in the PDMA pattern matrix, $BLER_k(SINR_{k,A})$ represents an estimated Block Error Rate (BLER) in the case that the power control pattern matrix of the user k is A, calculated based on a mapping of the SINR and the BLER, $\overline{R}_k(t)$ represents a historical average rate of the user k at a time point t, $P_t(\|A_k\|_1)$ represents total uplink transmission power in the case that the power control pattern matrix of the user k is A and $P_t(\|A_k\|_1)$ is smaller than or equal to maximum uplink transmission power $P_{max}$ of a user terminal, and $\|\cdot\|_1$ represents summing up matrix elements;
the historical average rate is calculated based on the formula $\overline{R}_k(t)=\alpha \cdot R_k(t)+(1-\alpha) \cdot \overline{R}_k(t-1)$, wherein $\overline{R}_k(t)$ represents the historical average rate of the user k at a current time point t, $\overline{R}_k(t-1)$ represents the historical average rate of the user k at a previous time point t−1, $R_k(t)$ represents a current rate of the user k, α represents a forgetting factor, and the PF weighted sum throughput is related to the current rate of the user k in the case that α=1.

5. The device according to claim 4, wherein the processor is further configured to read a program stored in the memory to select an uplink power control simplification mode, and determine whether a first simplification mode or a second simplification mode for determining the power control pattern matrix is used, based on a ratio of the uplink transmission power of the user to an uplink transmission power of an Orthogonal Frequency Division Multiple Access (OFDMA) user, wherein
in the first simplification mode, the uplink transmission power of the user is equal to the uplink transmission power of the OFDMA user, a smallest unit of resources occupied by the user is one PDMA pattern vector group and one PDMA pattern vector group is permitted to occupy a plurality of Physical Resource Blocks (PRBs), and a smallest unit of resources occupied by the OFDMA user is one PRB;
in the second simplification mode, the uplink transmission power of the user is a multiple of a number of rows of the PDMA pattern vector group of the uplink transmission power of the OFDMA user, and the power control pattern matrix enables a transmission power of the smallest unit of the resources occupied by the PDMA user to be equal to a multiple of the number of rows of the PDMA pattern vector group of a transmission power of the smallest unit of the resources occupied by the OFDMA user.

6. The device according to claim 4, wherein the processor is further configured to read a program stored in the memory to determine uplink transmission power of each user per PRB unit, through an uplink power control.

7. An uplink power allocation system, comprising a base station and a receiver, wherein the base station comprises an uplink power allocation device, the uplink power allocation device comprises a processor, a memory and a transceiver, wherein the processor is configured to read a program stored in the memory to:
determine different kinds of users to be paired, based on locations of the users within the cell;
determine Pattern Division Multiple Access (PDMA) pattern matrixes, allocate different PDMA pattern vector groups for the users respectively, and obtain a power control pattern matrix based on the PDMA pattern vector groups; and
determine power control factors of the users, and determine an uplink transmission power of each user;
the transceiver is configured to receive and transmit data;
the processor is configured to perform a general processing; and the memory is configured to store data for the operation of the processor;

wherein the receiver comprises a processor, a memory and a transceiver, wherein the processor of the receiver is configured to read a program stored in the memory of the receiver to cancel the users demodulated correctly through a successive interference cancellation and detect the other users;

the transceiver of the receiver is configured to receive and transmit data;

the processor of the receiver is configured to perform a general processing; and the memory of the receiver is configured to store data for the operation of the processor of the receiver;

wherein the processor is further configured to read a program stored in the memory to:

determine a PDMA pattern matrix $H_{PDMA}(M*N)$ based on a total number of the users within the cell and total resources of a system, wherein M is a number of rows of the PDMA pattern matrix $H_{PDMA}(M*N)$ and N is a number of columns of the PDMA pattern matrix $H_{PDMA}(M*N)$;

calculate the PDMA pattern vector group for each user based on the PDMA pattern matrix $H_{PDMA}(M*N)$ a power control factor matrix $$\begin{bmatrix} \alpha_{11}^1 & L & \alpha_{1N_1}^1 & L & \alpha_{11}^K & L & \alpha_{1N_K}^K \\ \alpha_{21}^1 & L & \alpha_{2N_1}^1 & L & \alpha_{21}^K & L & \alpha_{2N_K}^K \\ M & O & M & L & M & O & M \\ \alpha_{M1}^1 & L & \alpha_{MN_1}^1 & L & \alpha_{M1}^K & L & \alpha_{MN_K}^K \end{bmatrix},$$

to generate the power control pattern matrix $$A = \begin{bmatrix} \alpha_{11}^1 & L & \alpha_{1N_1}^1 & L & \alpha_{11}^K & L & \alpha_{1N_K}^K \\ \alpha_{21}^1 & L & \alpha_{2N_1}^1 & L & \alpha_{21}^K & L & \alpha_{2N_K}^K \\ M & O & M & L & M & O & M \\ \alpha_{M1}^1 & L & \alpha_{MN_1}^1 & L & \alpha_{M1}^K & L & \alpha_{MN_K}^K \end{bmatrix} e H_{PDMA} = [A_1, A_2, L, A_K],$$

wherein

K represents a number of uplink paired user, $N_1$, $N_2$, ..., $N_k$ represent respectively the numbers of columns of the PDMA pattern matrix $H_{PDMA}(M*N)$ occupied by the users 1, 2, ..., K, wherein $N=N_1+N_2+L+N_K$, $A_1$, $A_2$, ..., $A_K$ represent respectively power control pattern vector groups for the users 1, 2, ..., K, and $\square$ represents a dot matrixing;

wherein the processor is further configured to read a program stored in the memory to:

select an uplink power control optimization mode;

adjust a current combination of the PDMA pattern vector group and the power control factor of each user, to enable a Proportional Fair (PF) weighted sum throughput to satisfy the formula $$A_{opt} = \underset{A}{\arg\max} \left\{ \sum_{k=1}^{K} \frac{T_k(SINR_{k,A}) \cdot (1 - BLER_k(SINR_{k,A}))}{\overline{R}_k(t)} \right\}$$

and $\|A\|_1 = 1$, and to maximize the PF weighted sum throughput per power consumption unit in the case that the users are paired, wherein $T_k(SINR_{k,A})$ represents a transmission rate of a user k in the case that the power control pattern matrix of the user k is A, calculated based on transmission bit numbers mapped from a Signal to Interference plus Noise Ratio (SINR) of the user k and resources occupied by the user k, a value of the SINR of the user k is related to the power control factors in the PDMA pattern matrix, $BLER_k(SINR_{k,A})$ represents an estimated Block Error Rate (BLER) in the case that the power control pattern matrix of the user k is A, calculated based on a mapping of the SINR and the BLER, $\overline{R}_k(t)$ represents a historical average rate of the user k at a time point t, $P_t(\|A_k\|_1)$ represents total uplink transmission power in the case that the power control pattern matrix of the user k is A and $P_t(\|A_k\|_1)$ is smaller than or equal to maximum uplink transmission power $P_{max}$ of a user terminal, and $\|\cdot\|_1$ represents summing up matrix elements;

the historical average rate is calculated based on the formula $\overline{R}_k(t) = \alpha \cdot R_k(t) + (1-\alpha) \cdot \overline{R}_k(t-1)$, wherein $\overline{R}_k(t)$ represents the historical average rate of the user k at a current time point t, $\overline{R}_k(t-1)$ represents the historical average rate of the user k at a previous time point t−1, $R_k(t)$ represents a current rate of the user k, $\alpha$ represents a forgetting factor, and the PF weighted sum throughput is related to the current rate of the user k in the case that $\alpha = 1$.

\* \* \* \* \*